Patented Feb. 17, 1948

2,436,100

UNITED STATES PATENT OFFICE 2,436,100

MONOAZO DYE CONTAINING A TRIFLUORO ACETYLAMINO GROUP

Joseph B. Dickey, Rochester, N. Y., assignor to Eastman Kodak Company, Rochester, N. Y., a corporation of New Jersey No Drawing. Application March 2, 1944, Serial No. 524,773

7 Claims. (Cl. 260—207)

This invention relates to azo dyes and to a process for the preparation thereof.

Azo dyes of the following general formula have been prepared:

I.

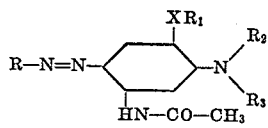

wherein R represents an aryl group of the benzene series, $R_1$ represents an alkyl group, $R_2$ represents hydrogen, an alkyl group or a hydroxyalkyl group, $R_3$ represents an alkyl group or a hydroxyalkyl group and X represents oxygen or sulfur.

I have now succeeded in preparing azo dyes resembling the aforesaid dyes, but differing in that the acetamino group is replaced by a trifluoroacetylamino group. My new dyes have greatly increased light-fastness on cellulose acetate rayon over the aforesaid prior dyes.

It is, accordingly, an object of my invention to provide new azo dyes and a process for the preparation thereof. A further object is to provide textile materials dyed with such dyes. Other objects will become apparent hereinafter.

In accordance with my invention, I provide azo dyes of the following general formula:

II.

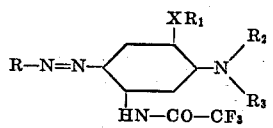

wherein R represents an aryl group of the benzene series, $R_1$ represents an aliphatic alcohol radical, $R_2$ represents hydrogen or an aliphatic alcohol radical, $R_3$ represents an aliphatic alcohol radical and X represents oxygen or sulfur, by condensing a diazonium salt of a primary amine of the benzene series with a coupling component of the following general formula:

III.

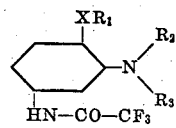

wherein X, $R_1$, $R_2$ and $R_3$ have the values set forth above in connection with Formula II.

The azo dye compounds having the following general formula:

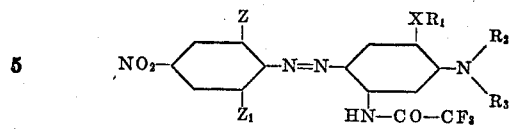

wherein Z represents a member selected from the group consisting of hydrogen and a nitro group, Z' represents a member selected from the group consisting of halogen, a cyano group, a hydroxyl group, an aliphatic acyl group, an alkylsulfonyl group, a sulfamyl group, a sulfamyl group in which one hydrogen has been replaced by an aliphatic alcohol radical, a sulfamyl group in which each hydrogen has been replaced with an aliphatic alcohol radical, and a trifluoromethyl group, $R_1$ represents an alkyl group, and $R_2$ and $R_3$ each represents an aliphatic alcohol radical, appear to be particularly advantageous.

Typical of the primary amines which are diazotized and coupled with the compounds of Formula III are: o-nitroaniline, o-fluoro-p-nitroaniline, o-chloro-p-nitroaniline, o-bromo-p-nitroaniline, o-cyano-p-nitroaniline, 2-amino-5-nitrophenyl-methyl ketone, 2-amino-5-nitrophenylmethyl sulfone, 2-amino-5-nitrobenzene-N-ethylsulfonamide, o-trifluoromethyl-p-nitroaniline, 2,4-dinitroaniline, 2,4-dinitro-6-fluoroaniline, 2,4-dinitro-6-chloroaniline, 2,4-dinitro-6-bromoaniline, 2,4-dinitro-6-iodoaniline, 2,4-dinitro-6-hydroxyaniline, 2,4-dinitro - 6-cyanoaniline, 2-amino-3,5-dinitrophenylmethyl ketone, 2-amino-3,5-dinitrophenylmethyl sulfone, 2 - amino-3,5 - dinitrobenzene-N-methylsulfonamide, 2 - amino-3,5 - dinitrobenzene-N-ethylsulfonamide and 2-amino-3,5-dinitrobenzene-N-(β-methoxyethyl)-sulfonamide.

Typical of the coupling components represented by Formula III (above) which are employed in practicing my invention are: 2-methoxy - 5 - trifluoroacetylamino-N-ethylaniline, 2-ethoxy-5-trifluoroacetylamino-N-(β-hydroxyethyl) - aniline, 2-(β-methoxyethoxy)-5-trifluoroacetylamino - N-(β-hydroxyethyl)-aniline, 2-(β-hydroxyethoxy) - 5 - trifluoroacetylamino-N-(β-hydroxyethyl)-aniline, 2 - methylmercapto-5-trifluoroacetylamino-N-(β-hydroxyethyl)-aniline, 2-methoxy-5 - trifluoroacetylamino - N-(γ,β-dihydroxypropyl)-aniline, 2-ethoxy-5-trifluoroacetylamino - 5 - N-(γ,β-dihydroxypropyl)-aniline, 2-ethoxy - 5 - trifluoroacetylamino - N,N-di-(β-hydroxyethyl)-aniline, 2-ethoxy-5-trifluoroacetylamino - N,N - di-(β-hydroxypropyl)-aniline, 2-methoxy-5-trifluoroacetylamino - N,N-di - (β-hydroxypropyl)-aniline, 2-methoxy-5-trifluoroacetylamino - N,N - di-(β-hydroxyethyl)-aniline, 2-methoxy-5-trifluoroacetylamino-N-ethyl-N-(β,γ-dihydroxypropyl) - aniline, 2-methoxy-5-trifluoroacetylamino-N - (β-hydroxyethyl)-N-(β,γ-dihydroxypropyl)-aniline, 2-methylthio-5-trifluoroacetylamino - N-(β,γ-dihydroxypropyl)-aniline, 2-trifluoromethylthio-5-trifluoroacetylamino-N-(β,γ-dihydroxypropyl)-aniline or 2-methylthio-5 - trifluoroacetylamino - N,N - di - (β-hydroxyethyl)-aniline. The following examples will serve to illustrate my new dyes and the manner of obtaining the same.

*Example 1.—4-(o-fluoro - p - nitrophenylazo)-2-methoxy - 5 - trifluoroacetylamino-N,N-di-(β-hydroxyethyl)-aniline*

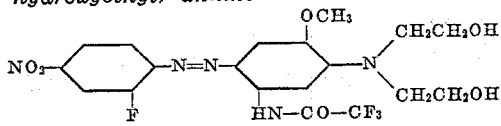

15.6 g. (0.1 mole) of o-fluoro-p-nitroaniline were suspended in 100 g. of water and 29 g. of concentrated hydrochloric acid. The mixture was cooled to 0°-5° C. by adding ice. Diazotization was effected by adding 6.9 g. of sodium nitrite dissolved in 30 cc. of water. The cold diazo solution was added to an iced solution of 32.2 g. (0.1 mole) of 2-methoxy-5-trifluoroacetylamino-N,N-di-(β-hydroxyethyl)-aniline in 150 cc. of acetic acid. The mineral acid was neutralized by adding sodium bicarbonate. The resulting mixture was diluted with water to precipitate the dye. The dye was filtered off, washed and dried. It colored cellulose acetate rayon fabrics rubine shades from an aqueous suspension of the dye.

*Example 2.—4-(6-chloro-2,4-dinitrophenylazo)-2 - methoxy-5-trifluoroacetylamino-N,N-di-(β-hydroxyethyl)-aniline*

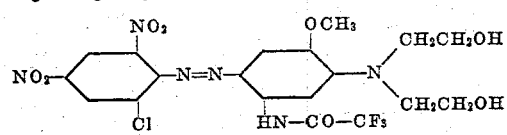

7.6 g. of sodium nitrite (dry) were added slowly with vigorous stirring to 50 cc. of sulfuric acid (95-96 per cent). The resulting mixture was stirred until a clear solution of nitrosyl sulfuric acid was obtained. The solution was cooled to 12° to 14° C. and 120 g. of acetic acid were added with stirring. Then 21.7 g. (0.1 mole) of 6-chloro-2,4-dinitroaniline and 100 g. of acetic acid were added to the mixture simultaneously with stirring, at 15° C. Stirring at 15° C. was continued for 2 hours. The resulting diazo solution was poured onto 250 g. of ice. To the resulting iced solution was added an iced solution of 32.2 g. (0.1 mole) of 2-methoxy-5-trifluoroacetylamino-N,N-di-(β-hydroxyethyl)-aniline dissolved in 20 cc. of concentrated hydrochloric acid and 70 cc. of water. The mineral acids were neutralized by immediately adding sodium acetate. The mixture was diluted with water to precipitate the dye. The dye was then filtered off, washed with water and dried. It colored cellulose acetate rayon fabrics greenish blue from an aqueous suspension of the dye.

*Example 3.—4-(6 - cyano-2,4-dinitrophenylazo)-2 - trifluoromethylthio-5-trifluoroacetylamino-N,N-di-(β-hydroxypropyl)-aniline*

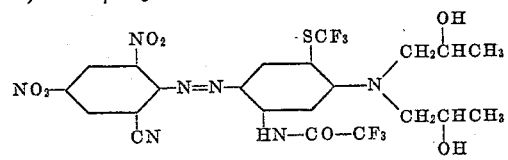

7.6 g. of sodium nitrite (dry) were added slowly with vigorous stirring to 50 cc. of sulfuric acid (95-96 per cent). The resulting mixture was stirred until a clear solution of nitrosyl sulfuric acid was obtained. The solution cooled to 12° to 14° C. and 120 g. of acetic acid were added with stirring. Then 20.8 g. (0.1 mole) of 6-cyano-2,4-dinitroaniline and 100 g. of acetic acid were added to the mixture simultaneously with stirring, at 15° C. Stirring at 15° C. was continued for 2 hours. The resulting diazo solution was poured onto 250 g. of ice. The resulting iced solution was added to a cold (10° C.) mixture of 37.2 g. (0.1 mole) of 2-trifluoromethylthio-5-trifluoroacetylamino-N,N-di-(β-hydroxypropyl) - aniline prepared by dissolving the aniline derivative in 200 g. of acetic acid and adding 92.2 g. of sodium carbonate. After coupling is complete (2 to 3 hours), the mixture was diluted with water to precipitate the dye. The dye was filtered off, washed with water and dried. It colored cellulose acetate rayon fabrics greenish blue shades from an aqueous suspension of the dye.

*Example 4.—4-[2,4-dinitro-6-(N-ethylsulfamyl)-phenylazo]-2-methoxy-5-trifluoroacetylamino-N-β,γ-dihydroxypropylaniline*

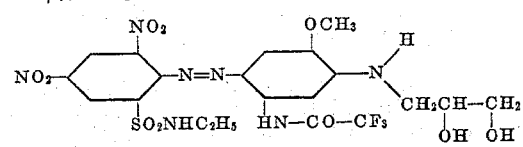

265 cc. of sulfuric acid (95-96 per cent) were cooled in an ice bath. 41 g. of dry sodium nitrite were added to the cooled sulfuric acid with vigorous stirring over a period of about 1 minute. The resulting mixture was stirred until a clear solution of nitrosylsulfuric acid was obtained. The mixture was cooled to 12° to 14° C. and 670 cc. of cooled acetic acid were added. The resulting mixture was chilled to 1° C. and 50 g. of 2,4-dinitro-6-(N-ethylsulfamyl)-aniline were added. 106 g. of 2,4-dinitro-6-(N-ethylsulfamyl)-aniline were added together with 530 cc. of acetic acid, keeping the temperature at 4° to 5° C. The resulting mixture was stirred at 4° to 5° C. for about 2 hours. The resulting solution was then poured into 10 liters of ice water. The resulting precipitate was filtered by suction and washed with water to remove acid. The precipitate was then suspended in 1.2 liters of acetic acid and the suspension cooled to 0° C. To this suspension were added 156 g. of 2-methoxy-5-trifluoroacetylamino-N-β,γ-dihydroxy propylaniline dissolved in 200 cc. of cold acetic acid. The resulting mixture was held at 4° to 8° C. for 4 hours and was then allowed to stand at 20° to 25° C. for 12 hours. The dye was precipitated by pouring the mixture into cold water, with stirring. Sodium carbonate was added to the resulting aqueous mixture to neutralize the mineral acid. The dye was filtered off by suction and dried at 20° to 25° C. The dye colored cellulose acetate rayon fabric blue from an aqueous suspension of the dye. In a similar manner 4-[2,4-dinitro-6-(N - β - hydroxyethylsulfamyl) - phenylazo]-2-methoxy - 5 - trifluoroacetylamino-N-(β,γ-dihydroxypropyl)-aniline was prepared.

The coupling components employed in practicing my invention can be prepared by first condensing p-aminophenylethers or thioethers, e. g., p-methoxyaniline, p-ethoxyaniline or p-methylthioaniline, with trifluoroacetyl chloride.

The resulting trifluoroacetylamino derivative is then nitrated with nitric acid and sulfuric acid to give a mononitro derivative in which the nitro group is ortho to the ether group. The mononitro compound is then reduced by hydrogenation in methyl alcohol, in the presence of a nickel catalyst, at 50° to 100° C. p-Trifluoromethylthioaniline can be prepared by nitrating trifluoromethylbenzene with nitric acid and sulfuric acid and then reducing the p-trifluoromethylnitrobenzene in methyl alcohol, with hydrogen and a nickel catalyst, at 50° to 100° C.

Diazo components, such as 2-amino-3,5-dinitrobenzene-N-methyl-, N-ethyl- or N-(β-methoxyethyl)-sulfonamide can be prepared by condensing 2-chloro-3,5-dinitro-1-sulfonyl chloride with a primary monoamine at a temperature below 0° C. and then condensing the resulting sulfonamide with ammonia, as described in the copending application of James G. McNally and Joseph B. Dickey, Serial No. 401,972, filed July 11, 1941, now U. S. Patent 2,358,465, issued September 19, 1944.

The azo dyes of my invention are of greatest utility for the coloration of textile materials comprising organic derivatives of cellulose. However, they may be employed for the coloration of non-vegetable textile fibers, in general. Thus, they can be used to color organic derivatives of cellulose, silk, wool, nylon, vinyl acetate-vinyl chloride copolymers and protein synthetic wools. Also cellulose ester and cellulose ether lacquers, as well as lacquers from polyvinyl compounds can be colored.

Typical organic derivatives of cellulose that can be colored include the hydrolyzed, as well as the unhydrolyzed, cellulose carboxylic esters, such as cellulose acetate, cellulose propionate and cellulose butyrate, and the hydrolyzed, as well as the unhydrolyzed, mixed cellulose carboxylic esters, such as cellulose acetate propionate and cellulose acetate butyrate, and the cellulose ethers, such as methyl cellulose, ethyl cellulose and benzyl cellulose.

The azo dyes of my invention are, for the most part, relatively insoluble in water and, accordingly, they may be advantageously directly applied to the textile material undergoing coloration in the form of an aqueous suspension which can be prepared by grinding the dye to a paste in the presence of a sulfonated oil, soap or other suitable dispersing agent, and dispersing the resulting paste in water. In some instances, the compounds may possess sufficient solubility in water to render the use of a dispersing agent unnecessary. Generally speaking, however, the use of a dispersing agent is desirable.

Direct dyeing operations can, with advantage, be conducted at temperatures of about 75° to 85° C., but any suitable temperature may be used. Thus, the textile material to be dyed or colored is ordinarily added to the dyebath at a temperature lower than that at which the main portion of the dying is to be effected, a temperature of from 45° to 55° C., for example, following which the temperature is raised to that selected for carrying out the operation. The temperature at which the process is continued may vary somewhat depending upon the particular material undergoing coloration. As is understood by those skilled in the art, the intensity of dyeing can be varied by varying the proportion of dye to the material undergoing preparation. Generally speaking, 1 to 3 per cent by weight of dye to material is employed, although any desired proportions can be used.

Suitable dispersing agents are disclosed in U. S. Patent 2,115,030, issued April 26, 1938. The process disclosed in the aforesaid patent for the dyeing of cellulose acetate can be used in applying the dyes of the present invention to cellulose acetate. While a satisfactory method for dyeing has been disclosed herein, it will be understood that any other suitable methods for dyeing the non-vegetable textile materials named herein can be employed. Lacquers may be colored with the dye compounds of my invention by the methods customarily employed in the lacquer art.

The colors which can be obtained on textile materials comprising cellulose acetate with representative of my new dyes are set forth in the following table:

| Coupling Component | Amine (diazo component) | Color |
|---|---|---|
| (1) 2-methoxy-5-trifluoroacetylamino-N-ethylaniline | p-nitroaniline | rubine. |
| (2) 2-ethoxy-5-trifluoroacetylamino-N-(β-hydroxyethyl)-aniline | do | Do. |
| (3) 2-(β-methoxyethoxy)-5-trifluoroacetylamino-N-(β-hydroxyethoxy)-aniline | do | Do. |
| (4) 2-(β-hydroxyethoxy)-5-trifluoroacetylamino-N-(β-hydroxyethyl)-aniline | do | Do. |
| (5) 2-methylthio-5-trifluoroacetylamino-N-(β-hydroxyethyl)-aniline | do | Do. |
| (6) 2-methoxy-5-trifluoroacetylamino-N-(β,γ-dihydroxypropyl)-aniline | do | Do. |
| (7) 2-ethoxy-5-trifluoroacetylamino-N-(β,γ-dihydroxypropyl)-aniline | do | Do. |
| (8) 2-ethoxy-5-trifluoroacetylamino-N,N-di-(β-hydroxyethyl)-aniline | do | Do. |
| (9) 2-ethoxy-5-trifluoroacetylamino-N,N-di-(β-hydroxypropyl)-aniline | do | Do. |
| (10) 2-methoxy-5-trifluoroacetylamino-N,N-di-(β-hydroxypropyl)-aniline | do | Do. |
| (11) 2-methoxy-5-trifluoroacetylamino-N,N-di-(β-hydroxyethyl)-aniline | do | Do. |
| (12) 2-methoxy-5-trifluoroacetylamino-N-ethyl-N-(β,γ-dihydroxypropyl)-aniline | do | Do. |
| (13) 2-methoxy-5-trifluoroacetylamino-N-(β-hydroxyethyl)-N-(β,γ-dihydroxypropyl)-aniline | do | Do. |
| (14) 2-trifluoromethylthio-5-trifluoroacetylamino-N-(β,γ-dihydroxypropyl)-aniline | do | Do. |
| (15) 2-methylthio-5-trifluoroacetylamino-N-(β,γ-dihydroxypropyl)-aniline | do | Do. |
| (16) 2-trifluoromethylthio-5-trifluoroacetylamino-N,N-di-(β-hydroxyethyl)-aniline | do | Do. |

| Coupling Component | Amine (diazo component) | Color |
|---|---|---|
| (1) to (16) above | p-nitro-o-fluoroaniline | rubine. |
| Do | p-nitro-o-chloroaniline | Do. |
| Do | p-nitro-o-bromoaniline | Do. |
| Do | p-nitro-o-cyanoaniline | Do. |
| Do | 2-amino-5-nitrophenyl methyl ketone | Do. |
| Do | 2-amino-5-nitrophenyl ethyl sulfone | rubine to violet. |
| Do | 2-amino-5-nitrophenyl-N-ethylsulfonamide | Do. |
| Do | p-nitro-o-trifluoromethylaniline | Do. |
| Do | 2,4-dinitroaniline | violet to red-blue. |
| Do | 2,4-dinitro-6-fluoroaniline | blue to green-blue. |
| Do | 2,4-dinitro-6-chloroaniline | Do. |
| Do | 2,4-dinitro-6-bromoaniline | Do. |
| Do | 2,4-dinitro-6-iodoaniline | Do. |
| Do | 2,4-dinitro-6-hydroxyaniline | Do. |
| Do | 2,4-dinitro-6-cyanoaniline | Do. |
| Do | 2,4-dinitro-6-trifluoromethylaniline | Do. |
| Do | 2-amino-3,5-dinitrophenylmethyl ketone | Do. |
| Do | 2-amino-3,5-dinitrophenylmethyl sulfone | Do. |
| Do | 2-amino-3,5-dinitrobenzene-N-methylsulfonamide | Do. |
| Do | 2-amino-3,5-dinitrobenzene-N-($\beta$-hydroxyethyl)-sulfonamide. | Do. |
| Do | 2-amino-3,5-dinitrobenzene-N-($\beta$-methoxyethyl)-sulfonamide. | Do. | o-Fluoro-p-nitroaniline which I employ as a diazo component in practicing my invention can be prepared as follows: 32 g. (0.2+mole) of 4-nitro-1,2-difluorobenzene and 140 cc. of 28 per cent ammonia are heated together for 6 hours at 150° to 160° C. in a steel liner of a shaking autoclave. The mixture is cooled with shaking to room temperature and the mixture of water, ammonia, and solid is poured out; the liner is washed with water. The crude product is filtered from the liquors and recrystallized from methyl alcohol. The methyl alcohol solution is filtered and then stirred and cooled in an ice-salt bath while water is slowly added to the alcoholic solution until precipitation is complete. When filtered and dried the 4-nitro-2-fluoroaniline weighs 26.4 g., which is 90 per cent of the theoretical amount of 43.8 g. The melting point is 135° to 136° C.

The 1,2-difluoro-4-nitrobenzene employed above can be prepared as follows: 250 cc. of concentrated sulfuric acid (sp. gr. 1.84) and 220 g. of concentrated nitric acid (sp. gr. 1.42) are mixed and cooled to 0° C. While holding the temperature between 0° and 5° C., 162 g. of o-difluorobenzene are stirred in dropwise during 45 minutes. The temperature drops after the addition is complete and the mixture is stirred at —10° C. for one hour. Stirring is continued for three hours while the temperature rises to 14° C. The temperature of the reaction is now raised to 25° C. during 30 minutes and stirring is continued at this temperature for 30 minutes. 625 g. of cold water are now added. The temperature rises to 40° to 50° C. The oil is dissolved in carbon tetrachloride and separated from the watery liquors which are extracted again with carbon tetrachloride. The combined carbon tetrachloride liquors are washed with water, dilute sodium bicarbonate solution, and water. After the final washing, the carbon tetrachloride liquors are dried with calcium chloride overnight. The solvent is removed at atmospheric pressure at a temperature up to 100° C. The pressure is now reduced in the still and distillation is continued taking a cut up to 90° C./30 mm. The main cut distills at 80° to 81° C./14 mm. and weighs 190 g., which is 85.6 per cent of the theoretical amount of 222 g.

What I claim as my invention and desire to be secured by Letters Patent of the United States is:

1. An azo compound having the general formula:

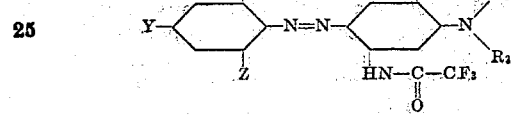

wherein Q represents a member selected from the group consisting of a hydrogen atom and a nitro group, Y represents a member selected from the group consisting of a hydrogen atom and a nitro group, at least one of the members Q and Y being a nitro group, Z represents a member selected from the group consisting of a hydrogen atom, a halogen atom, a cyano group, a hydroxyl group, a trifluoromethyl group, a low carbon alkylketo group, a low carbon alkylsulfone group, a

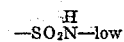

carbon alkyl group, a

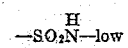

carbon alkoxyalkyl group and a

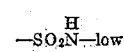

carbon hydroxyalkyl group, X represents a member selected from the group consisting of a low carbon alkoxy group, a low carbon thioalkyl group and a trifluoromethylthio group, $R_2$ represents a member selected from the group consisting of a hydrogen atom, a low carbon alkyl group and a low carbon hydroxyalkyl group, and $R_3$ represents a member selected from the group consisting of a low carbon alkyl group and a low carbon hydroxyalkyl group.

2. An azo compound having the general formula:

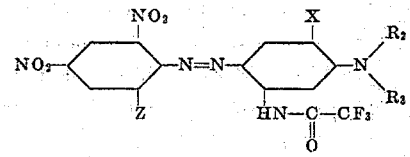

wherein $R_2$ represents a low carbon hydroxyalkyl group, $R_3$ represents a low carbon hydroxyalkyl group, X represents a low carbon alkoxy group and Z represents a halogen atom.

3. An azo compound having the general formula:

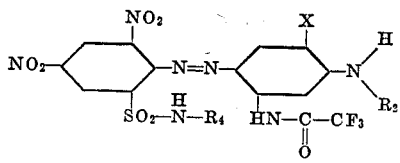

wherein $R_2$ represents a low carbon hydroxyalkyl group, $R_4$ represents a low carbon alkyl group and X represents a low carbon alkoxy group.

4. An azo compound having the general formula:

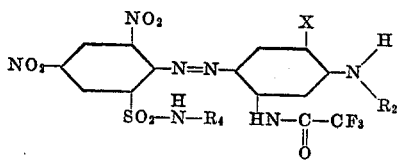

wherein $R_2$ represents a low carbon hydroxyalkyl group, $R_4$ represents a low carbon hydroxyalkyl group and X represents a low carbon alkoxy group.

5. The azo compound of the following formula:

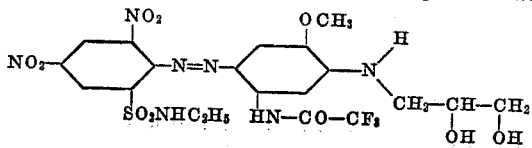

6. The azo compound of the following formula:

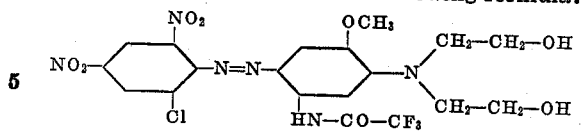

7. The azo compound which can be represented by the following formula:

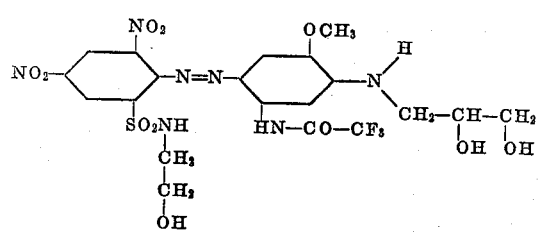

JOSEPH B. DICKEY.

REFERENCES CITED

The following references are of record in the file of this patent:

UNITED STATES PATENTS

| Number | Name | Date |
|---|---|---|
| 2,118,661 | Baumann | May 24, 1938 |
| 2,155,755 | Felix et al. | Apr. 25, 1939 |

Certificate of Correction

Patent No. 2,436,100.

February 17, 1948.

JOSEPH B. DICKEY

It is hereby certified that errors appear in the printed specification of the above numbered patent requiring correction as follows: Column 2, in the formula, line 7, for "$Z_1$" read $Z'$; column 7, line 40, for "43.8 g" read *30.8 g*; and that the said Letters Patent should be read with these corrections therein that the same may conform to the record of the case in the Patent Office.

Signed and sealed this 20th day of April, A. D. 1948.

[SEAL]

THOMAS F. MURPHY,
*Assistant Commissioner of Patents.*